INVENTORS
Donald H. Jacobs
Harold L. Shoemaker
Michael May

INVENTORS
Donald H. Jacobs
Harold L. Shoemaker
Michael May

INVENTORS
Donald H. Jacobs
Harold L. Shoemaker
Michael May

Oct. 4, 1955 D. H. JACOBS ET AL 2,719,670

ELECTRICAL AND ELECTRONIC DIGITAL COMPUTERS

Filed Oct. 18, 1949 13 Sheets-Sheet 4

INVENTORS
Donald H. Jacobs
Harold L. Shoemaker
Milan May

INVENTORS
Donald H. Jacobs
Harold L. Shoemaker
Michael Marcus

ELECTRICAL AND ELECTRONIC DIGITAL COMPUTERS

Filed Oct. 18, 1949 13 Sheets-Sheet 6

INVENTORS
Donald H. Jacobs
Harold L. Shoemaker
Michael May

ELECTRICAL AND ELECTRONIC DIGITAL COMPUTERS

Filed Oct. 18, 1949 13 Sheets-Sheet 7

INVENTORS
Donald H. Jacobs
Harold L. Shoemaker
Michael May

INVENTORS
Donald H. Jacobs
Harold L. Shoemaker
[illegible signature]

INVENTORS
Donald H. Jacobs
Harold L. Shoemaker
Michael Moz

Oct. 4, 1955 D. H. JACOBS ET AL 2,719,670

ELECTRICAL AND ELECTRONIC DIGITAL COMPUTERS

Filed Oct. 18, 1949 13 Sheets-Sheet 10

INVENTORS
Donald H. Jacobs
Harold L. Shoemaker
Michael Moy

INVENTORS
Donald H. Jacobs
Harold L. Shoemaker
Michael May

Oct. 4, 1955 D. H. JACOBS ET AL 2,719,670

ELECTRICAL AND ELECTRONIC DIGITAL COMPUTERS

Filed Oct. 18, 1949 13 Sheets-Sheet 12

INVENTORS
Donald H. Jacobs
Harold L. Shoemaker
Michael May 2,719,670
Patented Oct. 4, 1955

2,719,670

ELECTRICAL AND ELECTRONIC DIGITAL COMPUTERS

Donald H. Jacobs, Wood Acres, Harold L. Shoemaker, Bethesda, and Michael May, Ashton, Md.; said Shoemaker and said May assignors to said Jacobs Application October 18, 1949, Serial No. 122,109

9 Claims. (Cl. 235—61)

This invention relates to binary digital computers, and, more particularly, to any binary digital computer in which parallel addition methods are used, i. e. in which each digit in the addend is added to the corresponding digit in the augend simultaneously.

This invention is an auxiliary circuit which may be applied to any conventional binary computing register to produce a high speed binary computing register.

The object of this invention is to produce a modification of the conventional binary computing register which will allow the elementary arithmetic operations, i. e. addition, subtraction, multiplication, and division, to be performed in the shortest possible time.

The elementary arithmetic operations, as performed in a binary computer, are composed of elementary additions, plus certain supplementary operations such as shifting the binary numbers within the registers, clearing the registers, and taking a complement of certain binary numbers.

Therefore, more specifically, the object of this invention is a modification of the conventional binary computing register which will allow an addition operation to be performed in the shortest possible time.

For the sake of clarity in the description of this invention, certain terms relating to binary digital computers will now be defined and the meaning of the terms in the description of this invention will be precisely the same as the definitions.

1. *Binary computer.*—A convenient notation for a binary digital computer which is a computer for performing the basic arithmetic operations on numbers which are represented in powers of 2.

One method of writing such a binary number is to write all powers of 2 from the highest contained in the number to the lowest and to write either a 1 or 0 as the coefficient of each power of 2 depending on whether or not the number represented contains that particular power of 2.

Thus the decimal number 25 may be written as $$\begin{matrix} 1(2^4) & + 1(2^3) & + 0(2^2) & + 0(2^1) & + 1(2^0) & + 0(2^{-1}) & \\ =16 & +8 & +0 & +0 & +1 & +.0 & =25.0 \end{matrix}$$

The conventional method of writing a binary number is to write the coefficients only. Thus 11001.0 represents the decimal number 25.0. As will be explained presently, in the computer, the coefficient 1 is represented by the presence of some measurable quantity and the coefficient 0 is represented by the absence of the same measurable quantity. The reverse procedure can also be employed without changing the effectiveness of the invention.

2. *Binary register.*—A binary register is closely analogous to the register on a mechanical computing machine on which a decimal number is represented by the discrete rotation of a number of counter wheels. A binary register may be defined as any storage device in which a binary number may be represented by the presence or absence of some measurable quantity for each digit or stage or denominational order of the register.

The presence or absence of the measurable quantity is called the state of the stage. In this specification, the stage is considered to represent the coefficient 1 (and is thereby termed being in the 1 state) if the measurable quantity is present (or absent), and it thereby indicates a coefficient of 1 in the binary number represented by the register; and it is similarly considered to be in its 0 state if the measurable quantity is absent (or present), thereby indicating a coefficient of 0 in the binary number.

Some examples of binary registers are (1) a series of bi-stable electronic circuits having two stable states, and one or more outputs indicating the circuit state, (2) a series of switches, (3) a series of condensers (for short time storage), and (4) a series of relays.

3. *Static register.*—The term static register will be used to denote any binary register which is required only to store, and to indicate, the value of a binary number.

4. *Accumulator register.*—The term accumulator register will be used to denote any binary register which is required to perform binary addition within the register. In order to satisfy this requirement three conditions must be met: (1) When a particular signal is applied to each stage, each stage is required to change its state regardless of whether the initial state was 1 or 0, (2) each stage is required to pass a signal into the succeeding stage if the state was changed from 1 to 0, this signal being called a "carry," and (3) each carry must be delayed by a time interval sufficiently long to permit the succeeding stage to settle down from its last previous trigger before being triggered again.

5. *Modified accumulator register.*—The term modified accumulator register will be used to denote a binary register in which it is necessary to fulfill only condition 1 of paragraph 4 above.

6. *Bi-stable circuit.*—The term bi-stable circuit will be used to denote any electrical or electronic circuit which has two controllable stable states, either of which may be indicated by some measurable quantity. One specific embodiment of a bi-stable circuit is a modified Eccles-Jordan trigger circuit which is commonly used in binary computer registers. NOTE.—The term "modified Eccles-Jordan trigger circuit" (or shortened forms of this name), will be used to describe a circuit which is now conventionally called an Eccles-Jordan circuit, but which is different in details from the original circuit of Eccles and Jordan. The type of circuit to which reference is made is shown in Fig. 13.15(*b*) of "Radar System Engineering" by Ridenour (McGraw-Hill, New York, 1947). Another type of bi-stable circuit is the bi-stable relay circuit. The scope of the invention is not limited to the above mentioned circuits but includes other bi-stable circuits known to the art.

7. *New high speed register.*—The new high speed register is a demonstration of the application of the invention. It comprises a conventional modified accumulator register to which an auxiliary circuit, the invention, has been added to produce a high speed accumulator register which performs elementary additions in 1/*n*th the time required for the addition of an *n* digit binary number in the conventional accumulator register.

8. *Auxiliary circuit.*—The invention will generally be referred to as the auxiliary circuit.

9. *Addition gates.*—These are gates of any conventional or non-conventional sort which are used to add the contents of one register of a computer to another. Such gates are well known to the art.

10. *Gate.*—A gate is defined as any circuit (some-times called a "gate circuit") or other device which may be caused, by the application of a suitable control signal (or signals), to perform one of two functions, viz., either (1) to allow a separate electrical signal to be propagated through the circuit so that it appears at the output essentially unchanged in amplitude and shape and may be used to perform some designated function, or (2) to essentially inhibit the last mentioned signal so that it is not allowed to appear at the output in a form which will perform the designated function. If the last mentioned electrical signal is permitted to go through the gate, the gate is said to be open. If the last mentioned electrical signal is not permitted to go through, the gate is said to be closed.

11. *Delay element.*—The term delay element will be used to denote any device known to the art into which an electrical signal may be fed at a time $t$, and which will emit an electrical signal (either the original signal or a new signal generated by the delay element) at a time $t+t_d$. The time $t_d$ is called the "delay time" of the element. Representative devices of this sort are delay lines, monostable or "one-shot" multivibrators, etc.

12. *Computing register.*—This is a generic term indicating any of the above-described types of registers used in a computer.

Additional terms will be defined as needed to clarify the description.

An adequate description of the invention requires, first, an explanation of the register which is conventionally used for parallel addition. This explanation will be followed by the description of the auxiliary circuit, its functioning in connection with the new high speed register, and the use of the new high speed register in a binary computing unit.

It will be understood that the various embodiments of our invention shown herein are by way of illustration only and it will be realized that various other embodiments can be readily visualized by those versed in the art.

In the accompanying drawings illustrating the invention:

Figure 1:
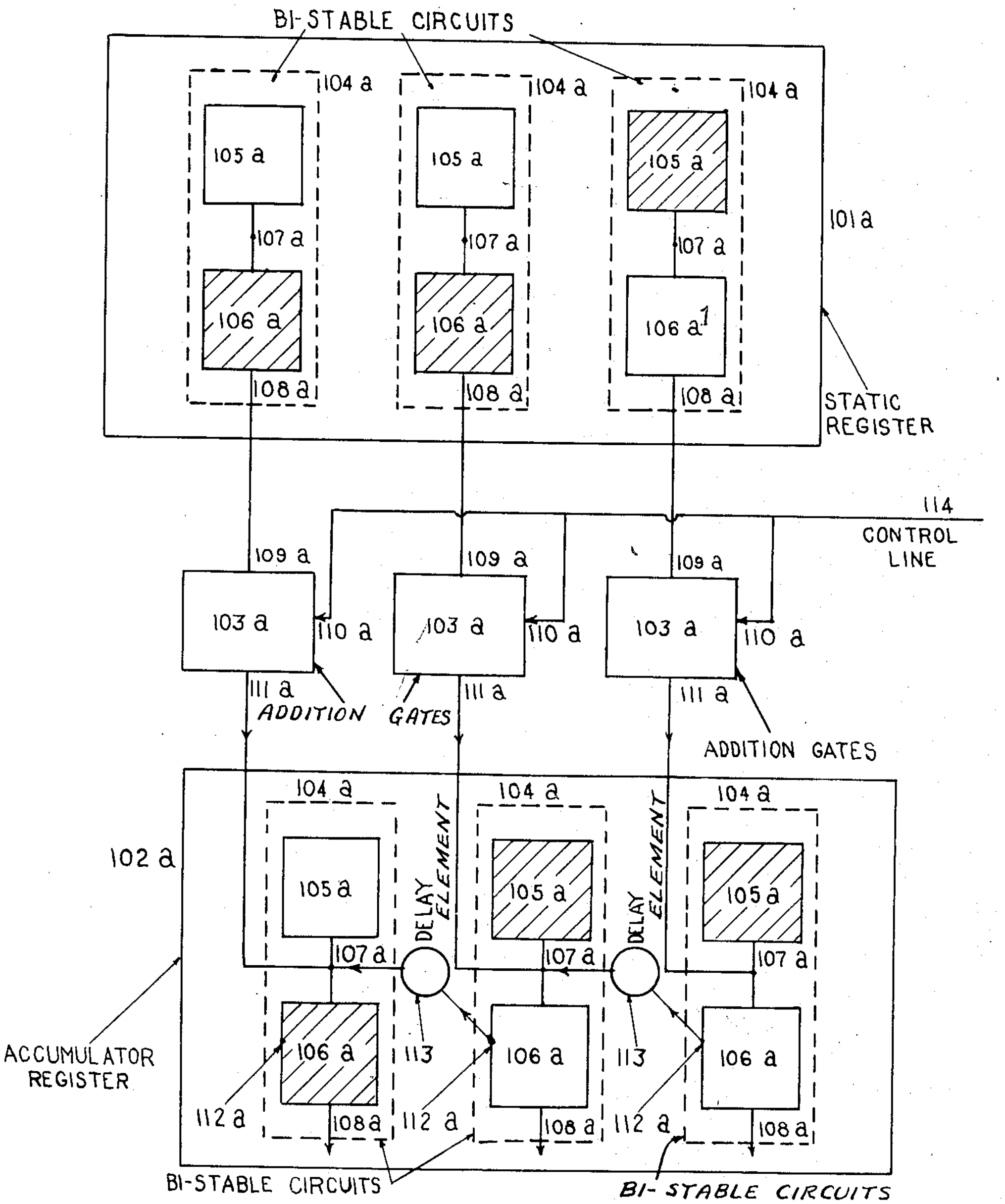
Fig. 1 illustrates part of a conventional digital computer set up for a representative addition operation.

The binary register conventionally used to perform parallel addition consists of a series of bi-stable circuits comprising two tubes each. The operation of a modified Eccles-Jordan trigger circuit will be described to clarify the action of a conventional register. As stated in definition 6, the Eccles-Jordan trigger circuit is one specific type of bi-stable circuit. In the modified Eccles-Jordan circuit one stable state is attained with one tube conducting and the other tube cut off. The other stable state is attained when the conducting tube has been cut off and the tube which was initially cut off has been made conducting. The two tubes have regenerative feedback connections so that if a change in state is initiated the change continues until the other stable state has been reached. The conduction state may be changed from one tube to the other by triggering a common signal input circuit with a negative pulse. While the tubes are changing state said circuit is obviously insensitive to further input pulses. The pulses for triggering the modified Eccles-Jordan circuit must therefore be spaced in time by at least the time required to change over the conduction states of the two tubes. This time will hereafter be termed the reaction time of a bi-stable circuit. A binary number is represented by the conduction state of each bi-stable circuit; one conduction state is regarded as representing the coefficient 0 and the other is regarded as representing the coefficient 1. As conventionally used, each stage is connected to the following stage i. e., the next higher order through a delay element. The stages are arranged so that when any stage changes from 1 to 0, the following stage receives a trigger pulse. The delay element is necessary because of the fact that all stages may be triggered simultaneously in the parallel addition process and therefore the interstage carries must be delayed so that the following stage may reach equilibrium and be ready to accept another trigger pulse before the carry pulse is fed into the following stage. Since any stage may be triggered by an initial addition pulse, and then triggered again by a carry pulse, the delay for the carry pulse must be at least as long as the reaction time of each bi-stable circuit. For an $n$-digit binary number, $n$ reaction times at most will be required, after the input of the parallel addition pulses, before the operation is completed.

As mentioned earlier, other types of registers are possible but are not in such general use. The other types include relay registers and switch registers. The relay registers may be used in a similar manner to that described above for the registers comprised of bi-stable circuits. The relay register requires essentially the same relative time (in terms of the reaction time of the accumulator register) to complete the addition process.

There are at least two variations of the inputs required in the parallel addition method in conventional usage. In one variation, the input is a pulse train which is fed into an $n$ (or $n-1$) section delay line where $n$ is the number of binary digits in the binary number. When the pulse train has traveled down the delay line so that one binary digit is located in each section of the delay line, gates which are connected between adjacent stages are switched so that the pulses are fed in parallel into the accumulator register. Addition by this method may require as many as $2n$ reaction times of the accumulator register.

The second variation utilizes as an input device a static register of bi-stable circuits. This static register is not required to possess carry facilities, i. e., it is not required to add within itself, but is required only to indicate the value of the number stored in its bi-stable circuits.

In conventional usage the static register indication controls a crystal or other type of gate which permits an addition pulse to be sent into the corresponding accumulator stage if the static register indicates a 1 and which inhibits the addition pulse if the static register indicates a 0.

Figure 3:
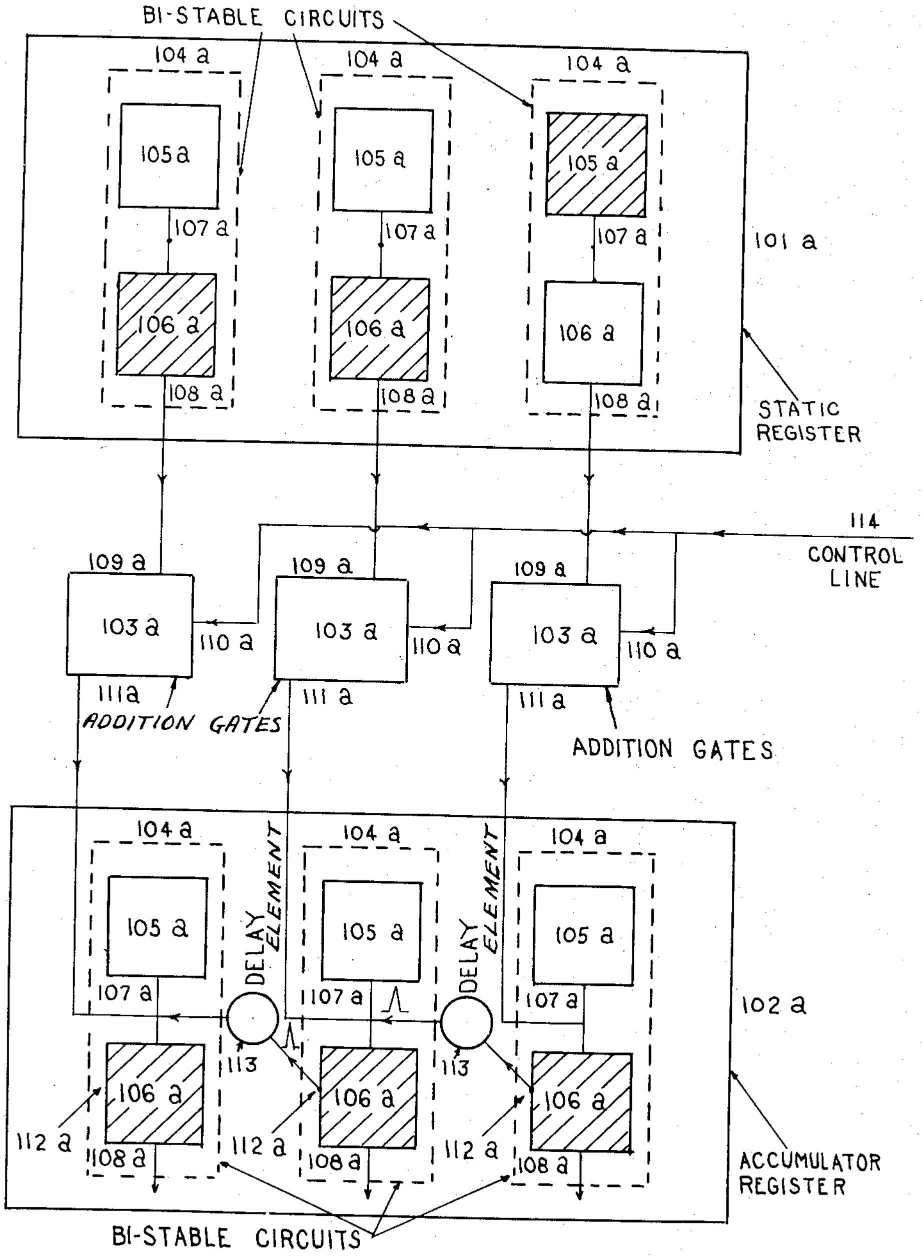
Fig. 3 shows the state of the device in Fig. 2 a short time later.
Figure 4:
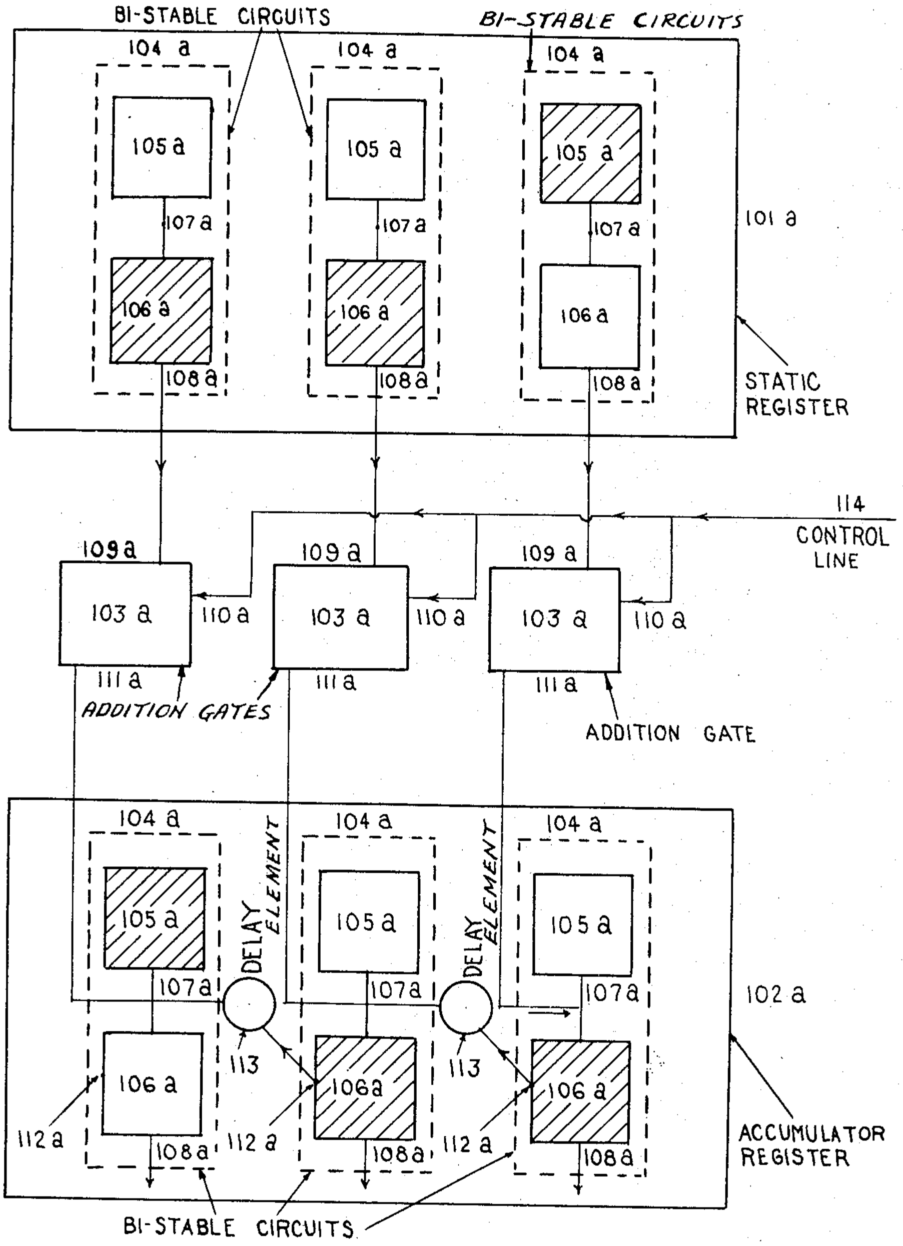
Fig. 4 shows the final effect of the application of a pulse to the control line of the device in Fig. 1.
Figure 5:
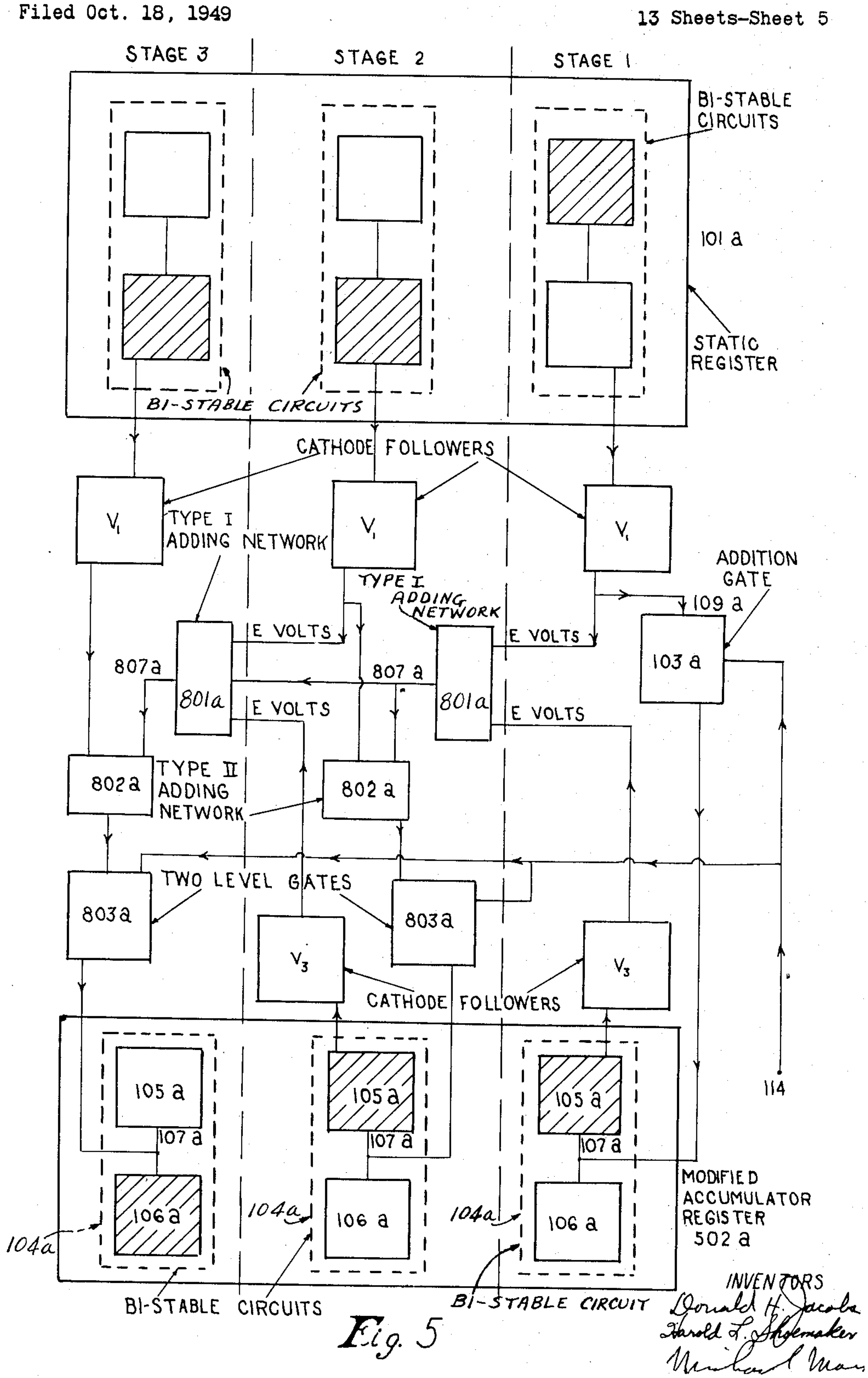
Fig. 5 shows a modification of Fig. 1 with the auxiliary circuit, which constitutes the invention, added thereto.
Figure 6:
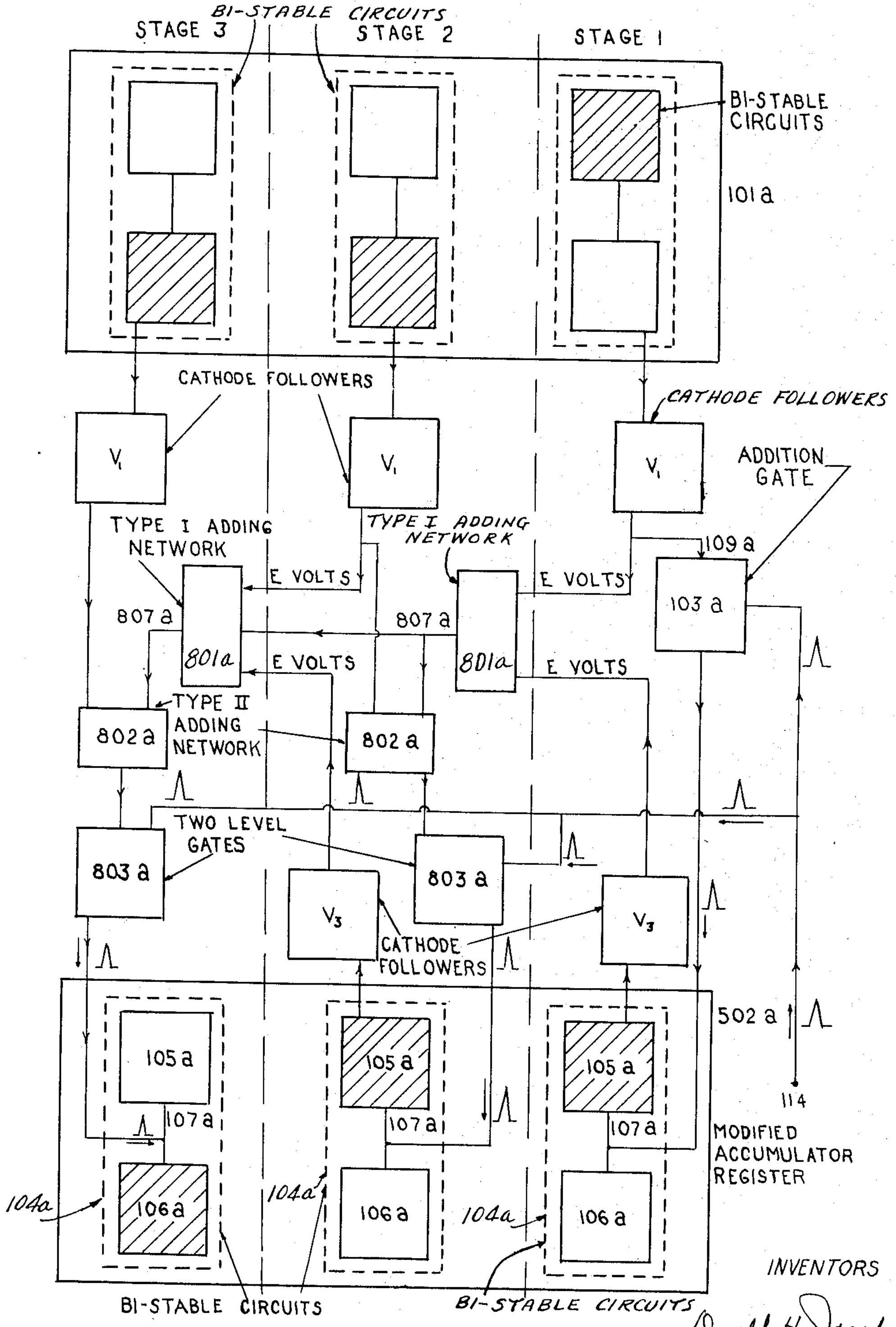
Fig. 6 shows the first effect of a pulse applied to the control line of Fig. 5.
Figure 7:
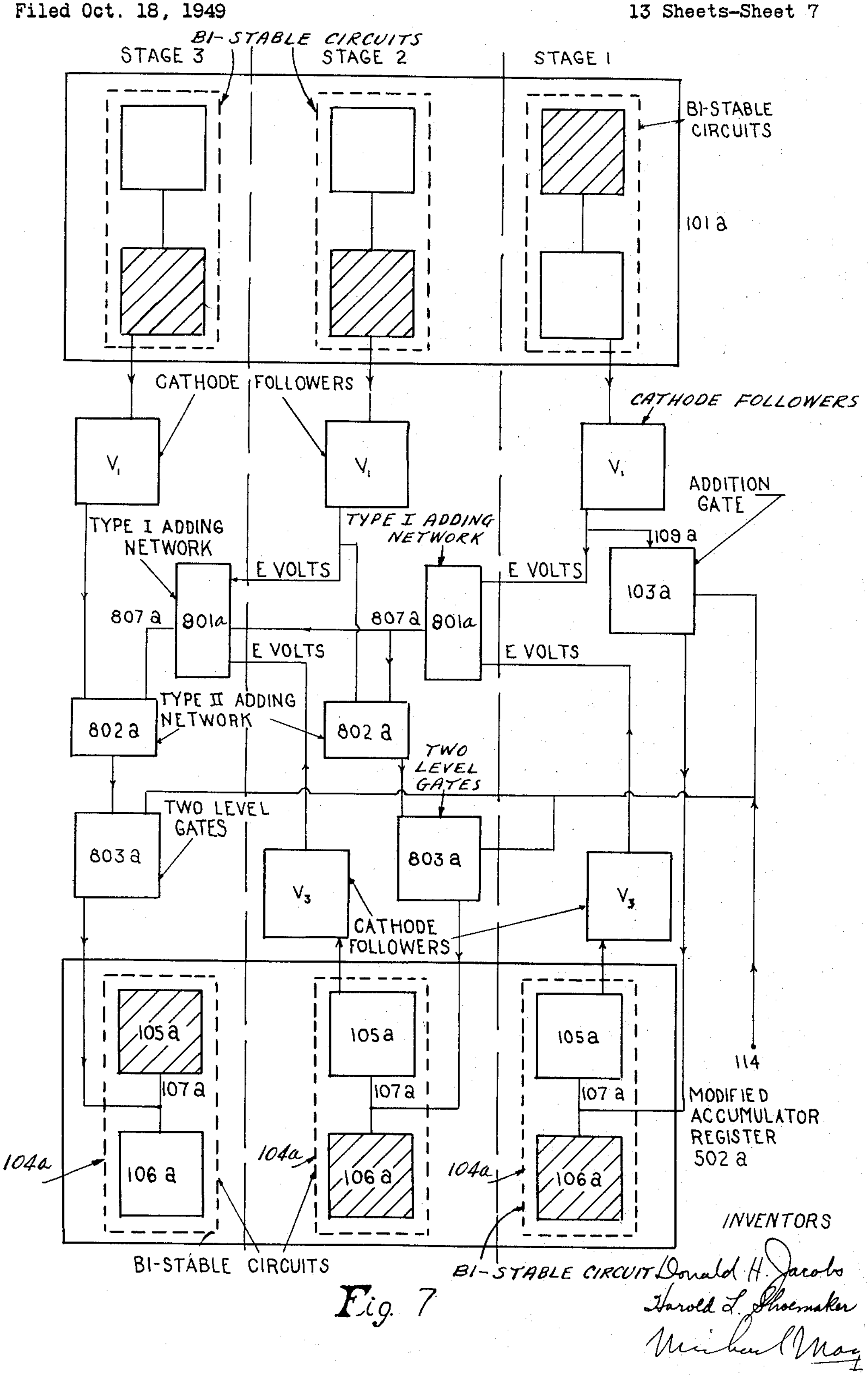
Fig. 7 shows the final effect of a pulse applied to the control line of Fig. 5.

In Figs. 1 through 7 addition by means of the new high speed register is compared with the conventional method of parallel addition. An explanation of the conventional method is given at this point as a starting point for the description of the functioning of the new high speed register. Figs. 5, 6, and 7 relating to the operation of the new high speed register will be explained after a detailed explanation of the invention. In Figures 1 through 4, the addition operation using a conventional static register 101*a*, a conventional accumulator register 102*a*, and a set of crystal gates 103*a* is demonstrated. A special form of conventional register comprised of bi-stable circuits is shown. Each bi-stable circuit stage 104*a*, is comprised of a tube 105*a* in which conduction is taken to represent a one for the corresponding binary digit and a second tube 106*a*, in which conduction is taken to represent a 0 for the corresponding binary digit. Conduction will be denoted by shading the conducting tube. At point 108*a* a voltage indication may be obtained which indicates whether the 1 tube is conducting or not. If the 1 tube is conducting, the gate 103*a* is opened so that a pulse applied to line 114 will be routed to point 111*a* via 110*a* and thence into the corresponding stage in the accumulator register. Point 107*a* is the common input to the bi-stable circuit.

A hasty examination of the rules for elementary binary addition will establish that register 102*a* is arranged to perform the binary addition function within the register. The rules are:

1. The sum of 0+0=0.
2. *a*. The sum of 0+1=1.
   *b*. The sum of 1+0=1.
3. The sum of 1+1=0 plus a carry 1 to the following stage.

Each bi-stable circuit in register 102*a*, in conjunction with the corresponding bi-stable circuit in register 101*a* and the connecting crystal gate, satisfies these three rules as follows:

If a 0 tube is conducting in any one bi-stable circuit in register 101*a*, the corresponding gate 103*a* is closed, and a pulse applied to line 114 is inhibited by this particular gate. Thus the corresponding bi-stable circuit in register 102*a* is unchanged. If the bi-stable circuit in register 102*a* were in the 0 state, it would be computed that the sum of 0+0=0, satisfying rule 1. If the said bi-stable circuit in the accumulator register 102*a* were in the 1 state, it would be computed that 0+1=1, thus satisfying rule 2*a*.

If tube 106*a* in bi-stable circuit 104*a* in register 101*a* is conducting representing *a*1, then the corresponding gate 103*a* is open, and a pulse applied to line 114 is fed through this gate into the corresponding bi-stable circuit 104*a* in the accumulator register 102*a*. The state of the bi-stable circuit in 102*a* will be changed by this pulse. If its state were initially non-conducting, representing a 0, it would be changed to 1. It would have been computed that 1+0=1, satisfying rule 2*b*. If its state were initially 1 it would be changed to 0 and would produce a carry pulse at point 112*a*. This carry pulse would then be fed through a suitable delay element 113 into the input 107*a* of the following stage in the next higher order. Thus it would have been computed that 1+1=0 plus carry 1 to the following stage, which satisfies rule 3.

Figure 2:
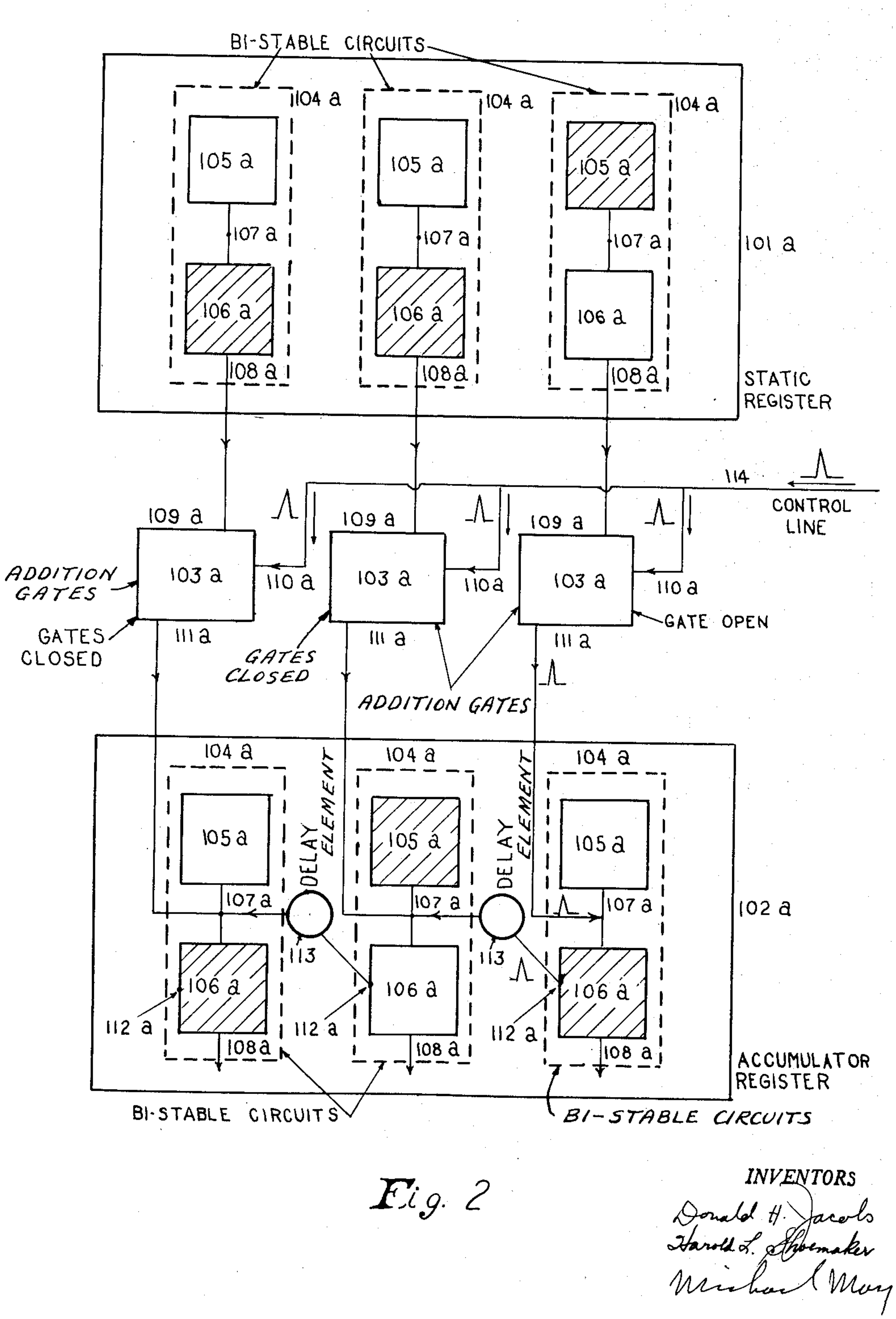
Fig. 2 shows the first effect of the application of a pulse to the control line in Fig. 1.

The successive steps involved in performing an addition of the binary number 001 to the binary number 011 are shown in Figs. 1, 2, 3, and 4. Figs. 2 and 3 show the progress of the carry pulses. Fig. 4 shows the final state of the accumulator register 102*a* on which the correct sum, the binary number 100, is found.

In the foregoing description, the conventional methods of performing the parallel addition operation have been explained and it has been shown that with the faster of the two variations of the parallel addition method an interval as long as *n* register reaction times may be required to complete the addition operation on a binary number containing *n* digits. The following description will explain the construction and application of the invention, the auxiliary circuit, which in combination with two conventional registers comprises the new high speed register. The said combination requires no longer than 1 reaction time of the modified accumulator register to obtain the correct sum of two numbers.

In describing the action of the auxiliary circuit, it will be convenient to generalize the definition of register reaction time to apply to any type of binary register. The reaction time of a binary register is defined, then, as the time following a signal requesting a change of state during which the register is changing state and hence is not capable of reacting to a second signal requesting a change of state.

Figure 8:
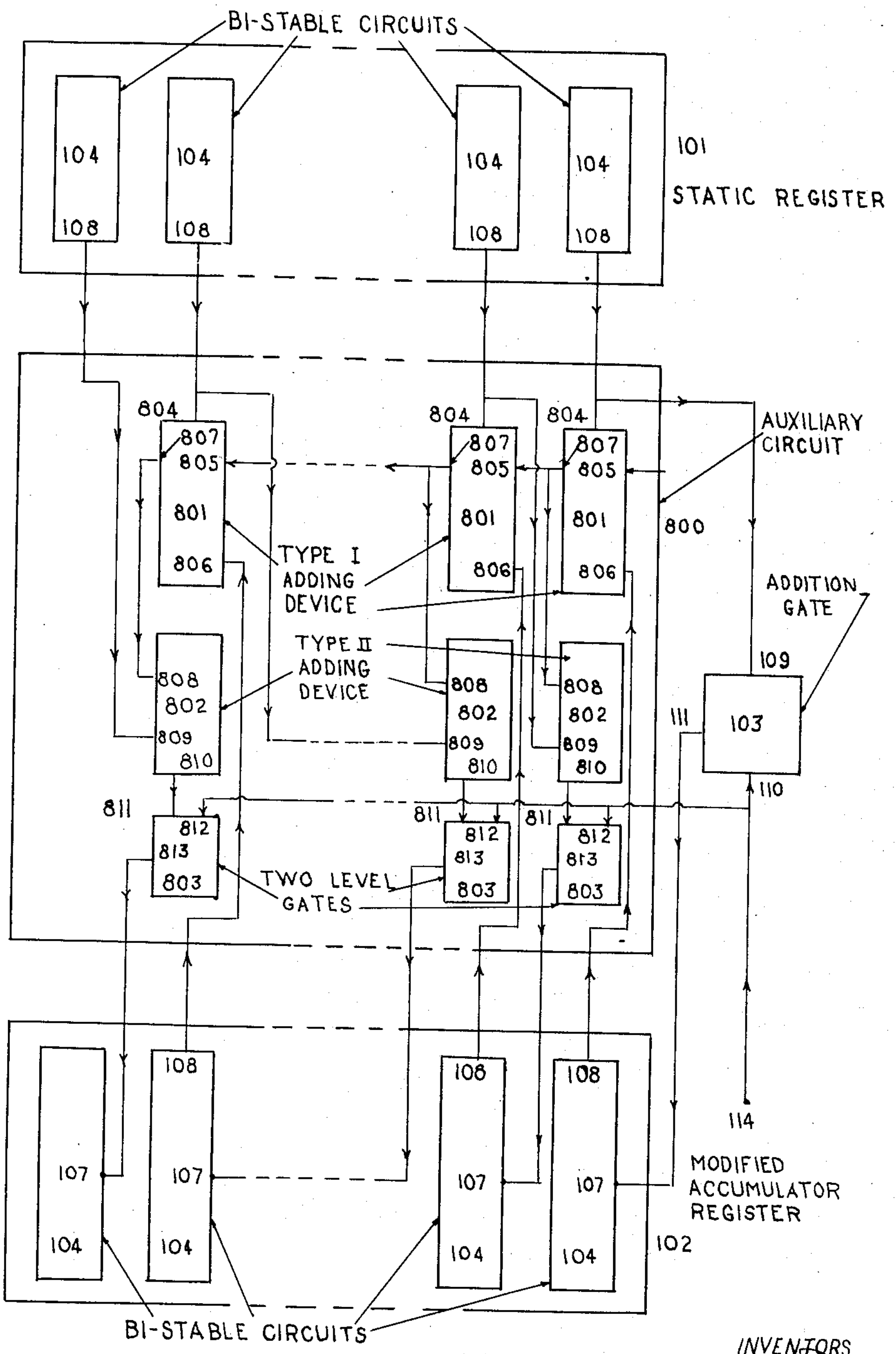
Fig. 8 illustrates the connections of the various components of the auxiliary circuit to a conventional static register and to a conventional modified accumulator register.

Fig. 8 shows the auxiliary circuit 800 which comprises three basic units (1) a type I adding device 801, (2) a type II adding device, 802, and (3) a two level gate 803.

The auxiliary circuit, 800, is used in conjunction with a conventional static register 101, a conventional modified accumulator register 102, and a conventional addition gate, 103, to produce a high speed register of the accumulator type. The register bi-stable circuits 104 may be of any type. Instead of carrying from one bi-stable circuit to the next higher order, during the addition process, the auxiliary circuit of the new high speed register indicates to the following bi-stable circuit before an addition process takes place that if the addition were to occur, it would receive a carry pulse, and the bi-stable circuit is accordingly set to change or not when the addition signal is applied to point 114. This signal is applied by a pulse generator as in the copending patent application of Donald H. Jacobs and Michael May, No. 122,108 filed of even date herewith, wherein pulse generator 101 supplies pulses to the computer at 106, 107, etc. At 106 the pulse might go to a set of gating devices to add together the contents of two registers. At 107 it might transfer the resulting sum to storage for future use, etc. Only those bi-stable circuits which would be left in a state different than their original state at the end of a normal addition operation are changed. The bi-stable circuits to be changed are all changed simultaneously, thus resulting in an addition in one reaction time of the augend or modified accumulator register bi-stable circuit 102.

The function of the type I adding device 801 is merely to provide at its output point 807 a carry indication. Input at any two or all three of the three input points 804, 805, and 806, produce a 1 indication at point 807. Input at none or only one of the three points will produce a 0 indication. There is no connection to input 805 in the rightmost block 801 because there are no previous stages from which a carry indication may be received. Therefore the rightmost type I adding device indicates a carry for inputs at both points 804 and 806. The function of the type II adding device 802 is to supply the input indication which controls the two level gate. The type II adding device supplies 3 discrete output levels. For 0 indication at point 808 and 0 indication at point 809 output level $K_1$ is indicated at point 810. For a 1 indication at point 808 and a 0 indication at point 809 or a 1 indication at point 809 and a 0 indication at point 808, output level $K_2$ is indicated at point 810. For a 1 indication at point 808 and a 1 indication at point 809, the output level $K_3$ will be indicated at point 810.

The function of the two level gate 803 is to permit the addition signals applied to point 812 via 114 to change the states of the appropriate stages to perform a proper addition. It is controlled by the type II adding device 802 as follows. For an input level $K_2$ at point 811, the gate is opened so that the addition signal applied to point 812 may go through to point 813 and thence to the register stage input point 107. For input levels $K_1$ and $K_3$ at point 811 the gate remains closed, and the signal at point 812 is inhibited.

An examination of the three rules for binary addition which have been stated earlier will show that the operation described above performs a proper addition. In each stage there is a possibility of 3 inputs, a 1 or 0 carry indication from a previous stage, a 1 or 0 parallel addition signal to the present stage, and a 1 or 0 digit, which is indicated by the state of the present stage itself. The three rules again are:

1. 0+0=0.
2. 1+0 or 0+1=1.
3. 1+1=0 and carry 1.

The rules may be rewritten to fit the three input case as follows.

*a*. 0+0+0=0.
*b*. 0+1+0=1.
*c*. 0+1+1=0+carry 1.
*d*. 1+1+1=1+carry 1.

In the following table the various combinations of inputs to the type II adding device in combination with the state of the stage under discussion are presented. The addition rule which is applicable and the final state resulting from a proper addition may be compared with the final state resulting from the action of type II adding device and the two level gate under the same conditions.

| Initial State of Modified Accumulator Register Stage | Indicated Carry Input At Point 808 | Indicated Parallel Addition At Point 809 | Applicable Addition Rule | Final State Desired | Final State Different Than Initial State? |
|---|---|---|---|---|---|
| 1 | 0 | 1 | c | 0 | Yes. |
| 1 | 1 | 0 | c | 0 | Yes. |
| 1 | 0 | 0 | b | 1 | No. |
| 1 | 1 | 1 | d | 1 | No. |
| 0 | 0 | 1 | b | 1 | Yes. |
| 0 | 1 | 0 | b | 1 | Yes. |
| 0 | 1 | 1 | c | 0 | No. |
| 0 | 0 | 0 | a | 0 | No. |

It has been stated that the function of the type I adding device is to indicate a carry only when 2 or 3 out of 3 inputs are 1 in any stage. Thus the type I adding device has satisfied the portions of rules *c* and *d* relating to carries.

The combination of the type II adding device and the two level gate changes the state of the register stage connected to the gate output only if a carry indication alone or a parallel addition input alone is present. Thus this combination has satisfied all the conditions in the table relating to the final state of the register stage.

In the rightmost stage of the modified accumulator register 102 (Fig. 8) there will be no indicated carry from a previous stage, therefore, the state of the stage must always be changed if there is an indication of a parallel addition input at point 108 of the rightmost stage of the static register 101. Therefore it is necessary to use a conventional addition gate which is normally closed and is opened by a 1 indication at input 109 (which is connected to point 108). A 1 indication at point 109 allows the addition signal at point 110 to be routed through output point 111 into the input point 107 of the rightmost stage of the modified accumulator register.

Thus it has been shown that an auxiliary circuit comprises the three basic units, the type I adding device, the type II adding device, and the two level gate. It has been shown that when the auxiliary circuit is used in conjunction with two conventional registers, and a conventional addition gate, a proper addition may be performed when an addition signal is applied to point 114. Inasmuch as all the appropriate register stages are changed simultaneously by the addition signal, the addition can be performed in 1 reaction time of the modified accumulator register.

The registers shown in Figure 8 have not been shown in detail because the principle of the auxiliary circuit may be applied to any type of static register which indicates a 1 or 0 by means of the presence or absence of some measurable quantity at point 108 and with any type of accumulator register whose states are indicated by the same measurable quantity at points 108 and whose stages may be made to change states by an appropriate signal from the two level gate into the stages at input point 107. The specific form of the type I adding device, the type II adding device and the two level gate will depend in each case on the specific form of register used. Some of the conventional registers which may be used are registers comprised of bi-stable vacuum tube circuits such as the modified Eccles-Jordan trigger circuit, the relay type registers and the switch type registers. In the modified Eccles-Jordan trigger circuit, the indication of state is the conduction of one or the other of the trigger tubes and the signal to change state is a voltage pulse. In the relay type registers the indication of state is a contact position( opening or closure) and the signal to change state is the application of current to the relay coil by means of the application of a voltage. In the switch-type registers, the state of each stage is indicated by the opening or closure of a contact point and the signal to change state is a mechanical displacement, or a pressure on one of the contacts. The principle of the auxiliary circuit could be applied with corresponding improvment to each of the registers mentioned. In the case of the relay or switch registers, the auxiliary circuit might be comprised of a combination of vacuum tubes, of vacuum tubes and relays, or of relays alone. The application of the auxiliary circuit to registers in which the measurable quantity is a voltage, and the signal to change states is a voltage pulse, will be described in more detail. It has been stated previously that the modified Eccles-Jordan trigger circuit mentioned above is one specific embodiment of this type of register.

Figure 9:
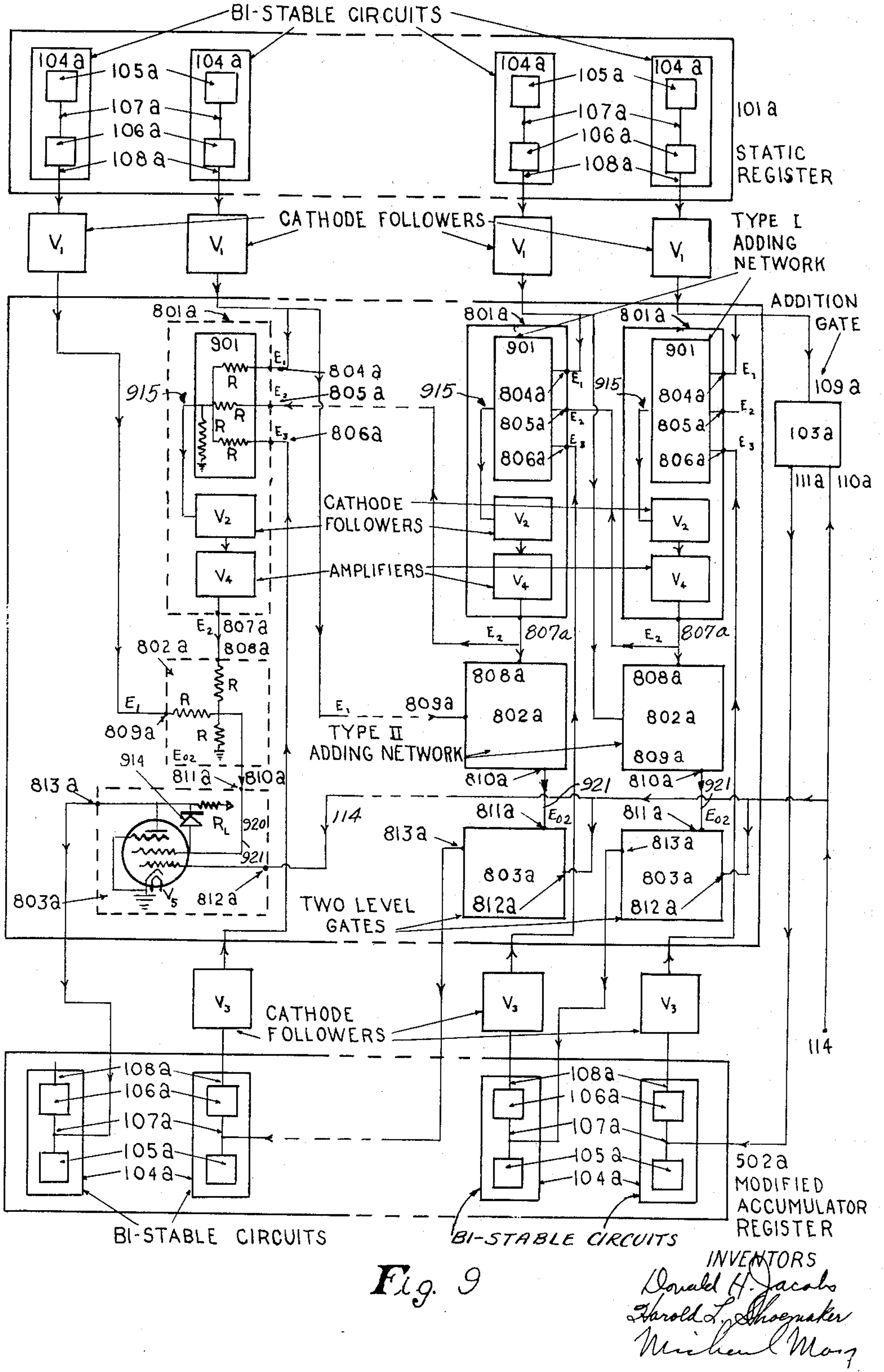
Fig. 9 illustrates one specific form of the auxiliary circuit used in connection with the registers shown in Fig. 8.

The application of the auxiliary circuit to the modified Eccles-Jordan type of register is illustrated in Figure 9. This application is offered merely as an example, without thought of having the auxiliary circuit confined to application to such registers. There are obviously several devices which satisfactorily add voltages and several devices which would satisfy the requirements for the two level gate. One type of each is illustrated in Figure 9 merely as an example, without any thought of being confined to the use of these particular forms of voltage adding device and two level gate.

In the example, three cathode followers $V_1$, $V_2$, and $V_3$ are used to provide interstage isolation. $V_1$ indicates by a voltage at its cathode the presence of a 1, i. e. a parallel addition input from the static register. $V_2$ indicates by a voltage at its cathode the presence of a carry indication from the previous stage. $V_3$ indicates by a voltage at its cathode a "1" in the modified accumulator register stage. Type I adding network 801*a* is one specific embodiment of the type I adding device 801 and comprises adding network 901, cathode follower $V_2$, and amplifier $V_4$. The combination of cathode follower $V_2$ and the cathode coupled low impedance amplifier $V_4$ is biased so that a usable output is obtained only if voltage indications are present at 2 out of the 3 or 3 out of the thee inputs to $V_2$. The low impedance amplifier $V_4$ is used to restore the output voltage of type I adding network 801*a* to the level required by the type II adding network 802*a* which is one specific embodiment of the type II adding device 802.

If a value of E volts is assumed for the three inputs $E_1$, $E_2$, $E_3$ of type I adding network 801*a* of Fig. 9, then the operation of the circuit may be described in somewhat greater detail. If the resistors are all equal to R the formula for the output of adding network 901 is $$E_{01}=\frac{E_1+E_2+E_3}{4}=\text{output voltage at point 915}$$

Since $E_1$, $E_2$, and $E_3$ are each E volts, or 0 volts, $E_{01}$ may have values of 0 volts, $E/4$, $E/2$, $3E/4$ volts.

It will be understood that $E_1$, $E_2$, and $E_3$ may have different values for each stage because the different stages may contain either 0's or 1's.

The cathode follower, $V_2$ in combination with the cathode coupled low impedance amplifier $V_4$ is biased so that the output $E_2$ changes from essentially 0 to E volts for a change of $E_{01}$ at point 915 of $E/4$ to $E/2$ volts and so that a further increase of $E_{01}$ to $3E/4$ volts results in no further change in $E_2$. The inputs to the type II adding network 802a are $E_2$ from amplifier $V_4$ of the previous stage and $E_1$ from cathode follower $V_1$ of the present stage. The output of type II adding network 802a, $E_{02}$ can be determined from the formula $$E_{02}=\frac{E_1+E_2}{3}$$

Neglecting the loading by the two level gate, the possible output voltages of type II adding network 802a are:

$$E_{02}=0=\text{level } K_1$$

$$E_{02}=\frac{E}{3}=\text{level } K_2$$

and $$E_{02}=\frac{2E}{3} \text{ volts}=\text{level } K_3$$

As mentioned above, the requirements imposed upon the two level pentode gate 803a are that the gate inhibit the addition pulse applied to the pentode gate at point 812a if the input level at point 811a is $K_1$ or $K_3$. The gate must pass the pulse for an input level at 811a of $K_2$, and consequently allow the corresponding bi-stable circuit 104a to be triggered.

A detailed description of the action of the two level pentode gate 803a is as follows:

The gate comprises a pentode tube $V_5$, a plate load $R_L$, a direct current plate supply at $K_3$ volts at point 920 and a rectifier 914. The grid of tube $V_5$ is normally held below zero potential so that the tube is cut off. The input to the gate at 812a is a positive pulse via line 114. The gate is controlled by the voltage level on the screen via line 921. When the screen of $V_5$ is held at $K_1$ volts, a positive pulse applied to the grid of $V_5$ will not appreciably change the plate voltage.

When the screen of $V_5$ is held at $K_2$ volts, a positive pulse applied to the grid of $V_5$ will cause the plate to drop from $K_3$ volts to $K_2$ (or slightly below $K_2$) volts. This can be arranged by making $R_L$ a relatively high resistance and R a relatively low resistance. If the plate drops below $K_2$ volts, plate current is supplied to the plate from low impedance amplifiers $V_1$ and $V_4$ through type II adding network 802a and rectifier 914, thus preventing a plate voltage drop of appreciably more than $K_3$–$K_2$ volts. This drop in plate voltage (i. e. a negative pulse) is applied to the associated bi-stable circuit 104a in register 502a and causes a change of state in the bi-stable circuit.

When the screen of $V_5$ is held at $K_3$ volts by type II adding network 802a, the plate and screen of $V_5$ are at approximately the same potential. A positive pulse applied to the grid of $V_5$ will then cause only a small drop in plate potential because most of the plate current is supplied by the relatively low impedance type II adding network 802a through the rectifier 914. The small negative pulse thus formed in the plate circuit of $V_5$ (when a positive pulse is applied to the grid) is insufficient in magnitude to change the state of the associated bi-stable circuit.

Thus a large pulse is produced for input level $K_2$ and a small pulse or no pulse at all is produced for input levels $K_1$ and $K_3$.

Thus we have described how a specific type of voltage adding network and a specific type of two level gate and associated cathode followers and amplifiers fulfill the requirements imposed upon the auxiliary circuit.

As soon as the binary numbers on which an operation is to be performed are transferred into the static register, and the modified accumulator register, the auxiliary circuit immediately sets itself up so that upon the application of an addition pulse to point 114, the correct bi-stable circuits will be triggered. Thus the addition is accomplished in 1 reaction time of the bi-stable circuits of the modified accumulator register. The maximum speed of successive additions is then determined by the time required for transfer of the number into the register plus the set-up time for the auxiliary circuit. For an *n* digit number the set up time is obviously the additive rise times of the carry indicator cathode follower $V_2$ and amplifier $V_4$ stages, i. e. *n* rise times.

The action of the new high speed register described above which utilizes the auxiliary circuit is shown in Figs. 5, 6, and 7. The binary number 001 in the conventional static register 101a is to be added to the binary number 011 in the conventional modified accumulator register 502a. Both conventional registers shown comprise modified Eccles-Jordan trigger circuits. The action of the new high speed register before the application of the addition pulse will be discussed stage by stage. Stage 1 of 101a is in its 1 state thereby causing a voltage indication of E volts at point 109a of the addition gate 103a. This opens the gate so that the addition pulse when applied will be permitted to trigger stage 1 of the modified accumulator register 502a.

Two of the three inputs to type I adding network 801a of stage 2 are E volts, therefore an output of E volts is obtained at point 807a. This voltage is applied to type I adding network 801a of stage 3 and also to one input of type II adding network 802a of stage 2. According to the rules for type II adding network 802a and two level gate 803a, for 1 out of 2 inputs, the addition pulse when applied will be permitted to trigger stage 2.

Two of the three inputs to 801a of stage 3 are approximately E volts thereby causing a carry indication of E volts at point 807a. This voltage is applied to one input of 802a. As in stage 2, 802a has E volts approx. at only one of its 2 inputs. Therefore, the addition pulse when applied will be permitted to trigger the bi-stable circuit 107a of stage 3.

Since both two level gates and the conventional addition gate are all three open, all three bi-stable circuits in register 502a will be triggered when the addition pulse is applied to control line 114 connected in parallel to said gates.

Fig. 6 shows the progress of the pulses in the foregoing description.

Fig. 7 shows the final states of the modified accumulator register stages.

Certain supplementary operations are necessary for a computing register in order that subtraction, multiplication, and division may be performed as a series of elementary additions. The three primary supplementary operations are (1) shifting the binary number within the register, (2) clearing the register, i. e. causing all stages to return to the 0 state, and (3) taking the "complement" of a number contained in the register.

Figure 10:
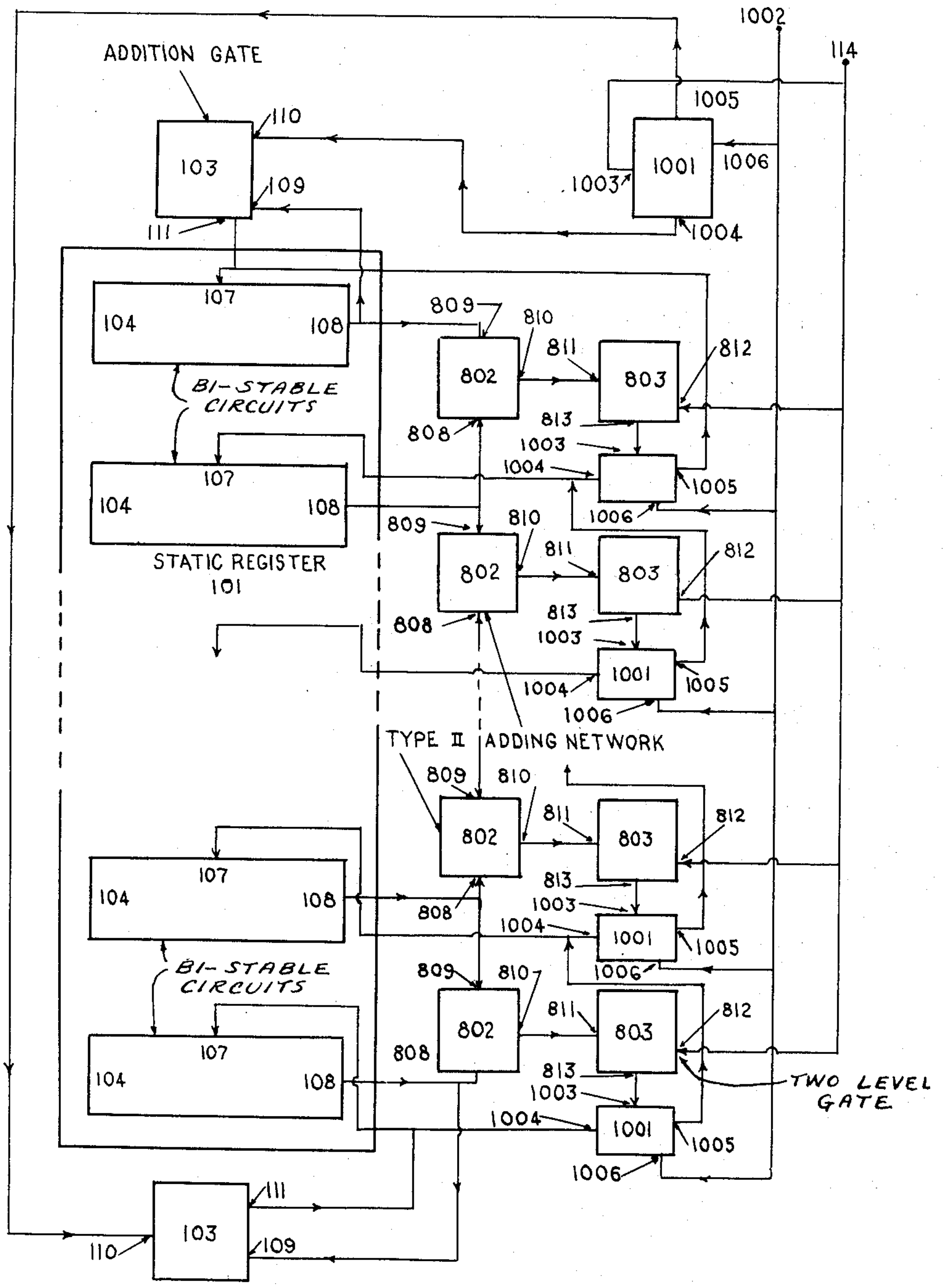
Fig. 10 illustrates the application of a part of the auxiliary circuit in performing the shifting operation of a modified accumulator register.

(1) The shifting of a number within the register may be accomplished by the use of a type II adding device 802 and a two level gate 803, as shown in Figure 10. If the preceding bi-stable circuit (i. e. adjacent and to the right when the drawing is rotated so that the bi-stable circuits are uppermost left) in the register is in the same state (either 1 or 0) as the bi-stable circuit being considered, then the state of the later stage need not be changed when a number is shifted one place to the left. If the preceding bi-stable circuit is in a different state than the bi-stable circuit being considered, then the state of the bi-stable circuit under consideration should be changed, thereby transferring the state from the preceding to the stage under consideration. If gate 1001 of a type well known to the art is used to send the trigger signal either right or left then a shift to the right or to the left may be accomplished with the same arrangement. By application of voltage to line 1002 the gate input signal at 1003 is routed either through output line 1004 or line 1005 thereby changing the present stage or the preceding stage. Thus a pulse applied to line 114 would cause a shifting of the number within the register, the direction of which would be determined by whether or not a voltage had been applied to line 1002.

It should be pointed out, however, that a shift to the right is not necessary for construction of a computing unit which will perform the elementary arithmetic operations.

In practice it is desirable to reset the right-most stage to 0 when the first left shift is performed and the left-most stage to 0 when the first right shift is performed. This may be accomplished by the addition of one extra gate 1001 and two conventional addition gates, 103.

This method of shifting is peculiar to the high speed register described in this patent application, i. e. it requires a portion of the auxiliary circuit. It may be used with any type of register element.

There is an alternative method of shifting which involves a conventional technique, that of adding the contents of the high speed register to itself. This is equivalent to multiplication by 2 which shifts all digits in the number 1 stage to the left in the register. If the carry indications are reversed, i. e. provide an indication to the preceding stage instead of the following stage, a shift one stage to the right could be accomplished, although a right shift is not necessary in a binary digital computer for performing additions, subtractions, multiplications, or divisions.

Figure 11:
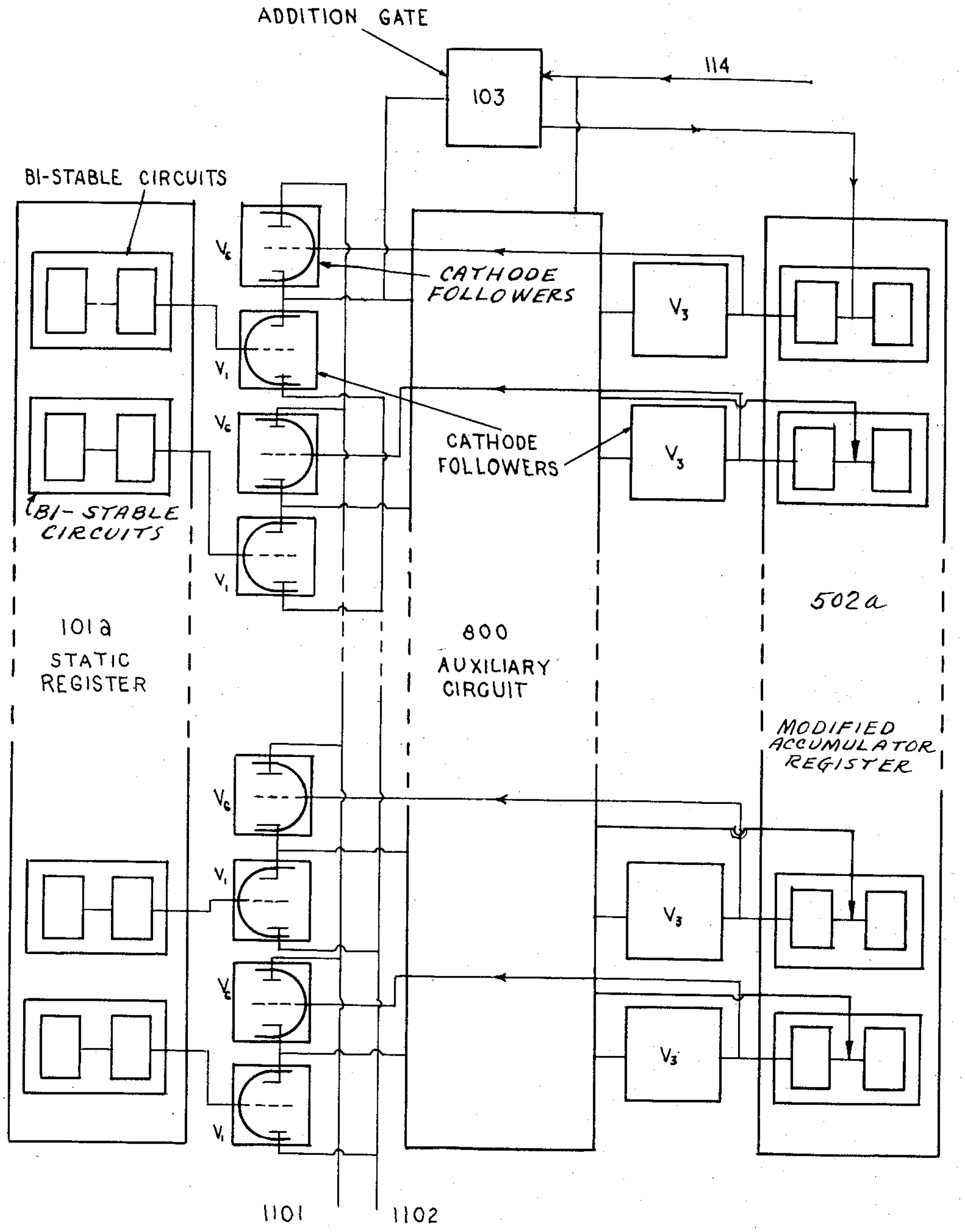
Fig. 11 illustrates the application of the complete auxiliary circuit and associated components in performing the shifting operation in a modified accumulator register.

A shift using the alternative method described in the preceding paragraph may be accomplished in two ways, (*a*) the number in the high speed register could be transferred to a static register through conventional gating devices. Then the contents of the static register could be added to the high speed register. This operation would require 2 reaction times of the high speed register for its completion. (*b*) In the register shown in Fig. 9, which is comprised of modified Eccles-Jordan bi-stable circuit elements, an additional cathode follower per stage could be added to the static register. This arrangement is illustrated in Fig. 11. The grid of $V_6$ is attached to the corresponding high speed register stage and $V_6$ and $V_1$ have a common cathode resistor so that when the anode voltage is switched from the anode of $V_1$ to the anode of $V_6$, the auxiliary circuit is set-up so that the contents of the high speed register may be added to itself. Selection lines 1101 and 1102 are provided for application of the anode voltage to the correct cathode follower. The time required for performing a shift in this manner is 1 set-up time for the auxiliary circuit plus 1 reaction time of the high speed register.

Thus there are three methods by means of which the auxiliary shifting operation may be performed. Method (1) requires the addition of 1 two level gate to the register and permits shifting in 1 reaction time of the high speed register. Method (2) requires the use of two sets of gating devices and the use of 1 static register, any of which may be present for use in other connections. This method allows shifting in 2 register reaction times. Method (3) requires the addition of 1 cathode follower per stage and permits shifting in 1 reaction time of the high speed register plus the set up time of the auxiliary circuit.

(2) The method of clearing a register, i. e. resetting all register elements to the "0" state will depend on the register element used. One conventional method of clearing a register comprised of a conventional type of modified Eccles-Jordan type circuit will be described. A positive pulse is applied to the control grids of the "0" tubes. If the grid to which the pulse is applied is negative, indicating that the tube is non-conducting, then the grid will be affected and the pulse will trigger the stage. If on the other hand the "0" tube is already conducting, the pulsed grid will already be positive and will not be affected. The networks connecting the grids in the 0 and 1 tubes divide the applied signal in such a way that only the grid to which the signal is applied will be affected.

Figure 12:
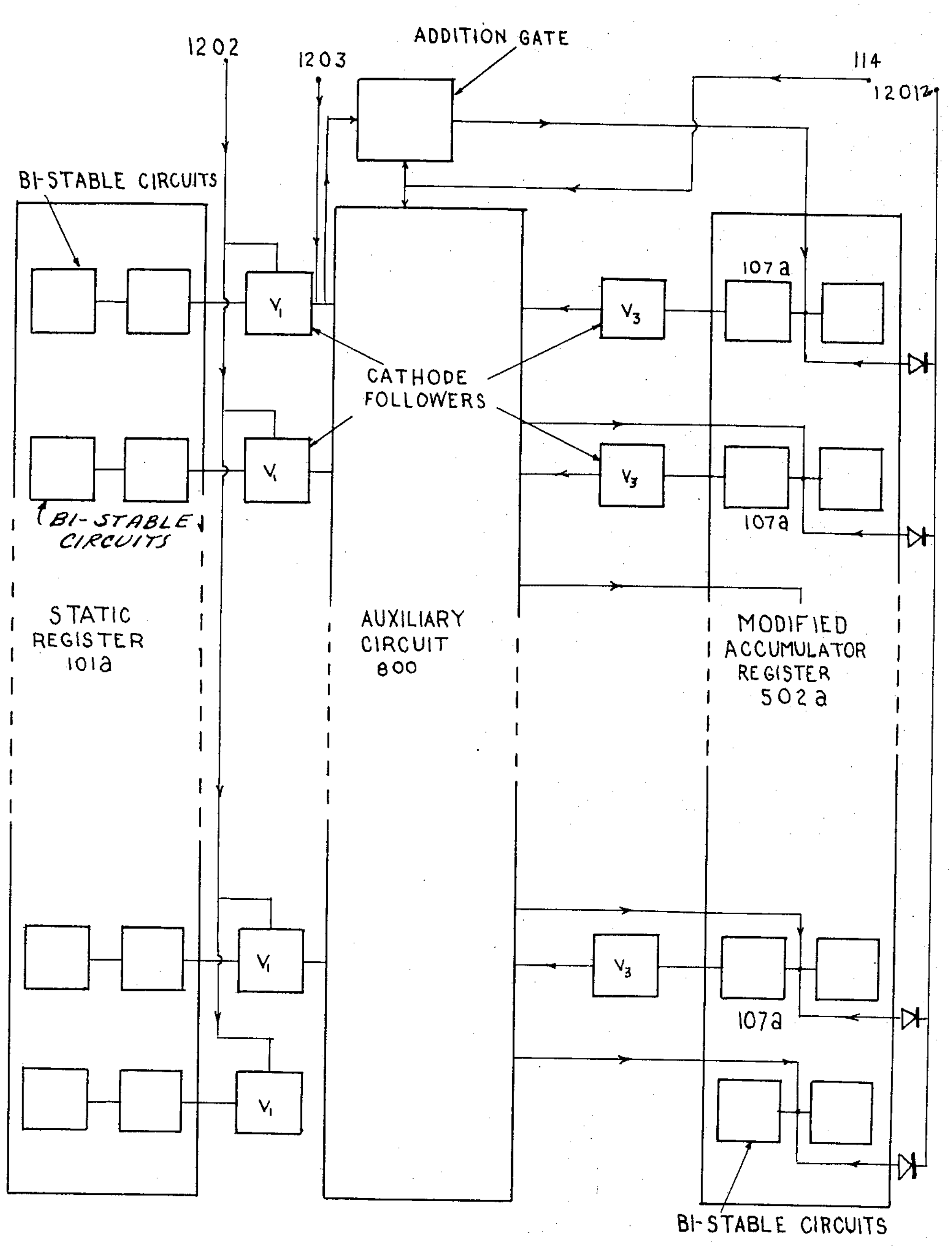
Fig. 12 illustrates one method by which a complement may be obtained in the new high speed register.

(3) The complement of a number is obtained by first changing the conduction states of all stages in the register and then adding 1 unit to the number obtained. In Fig. 12 one method of several by means of which a complement may be obtained in a high speed register which was shown in Fig. 9 is illustrated. The following steps are involved in the complement process:

*Step 1.*—(*a*) A negative pulse is applied to line 1201 which changes the state of all tubes in the modified accumulator register.

(*b*) All the cathode followers $V_1$ are deenergized either by biasing or the removal of the anode voltage from line 1202.

(*c*) A potential E is applied to line 1203, thereby simulating an input of 1 unit from the $V_1$ cathode followers.

*Step 2.*—A normal addition pulse is applied to line 114 so that 1 unit is added to the number which was obtained by changing 1's to 0's and vice versa in the high speed register.

Thus a true complement of a number is obtained in 2 register reaction times. In certain instances it is permissible to use the complement less one unit which could be obtained in only 1 register reaction time.

Figure 13:
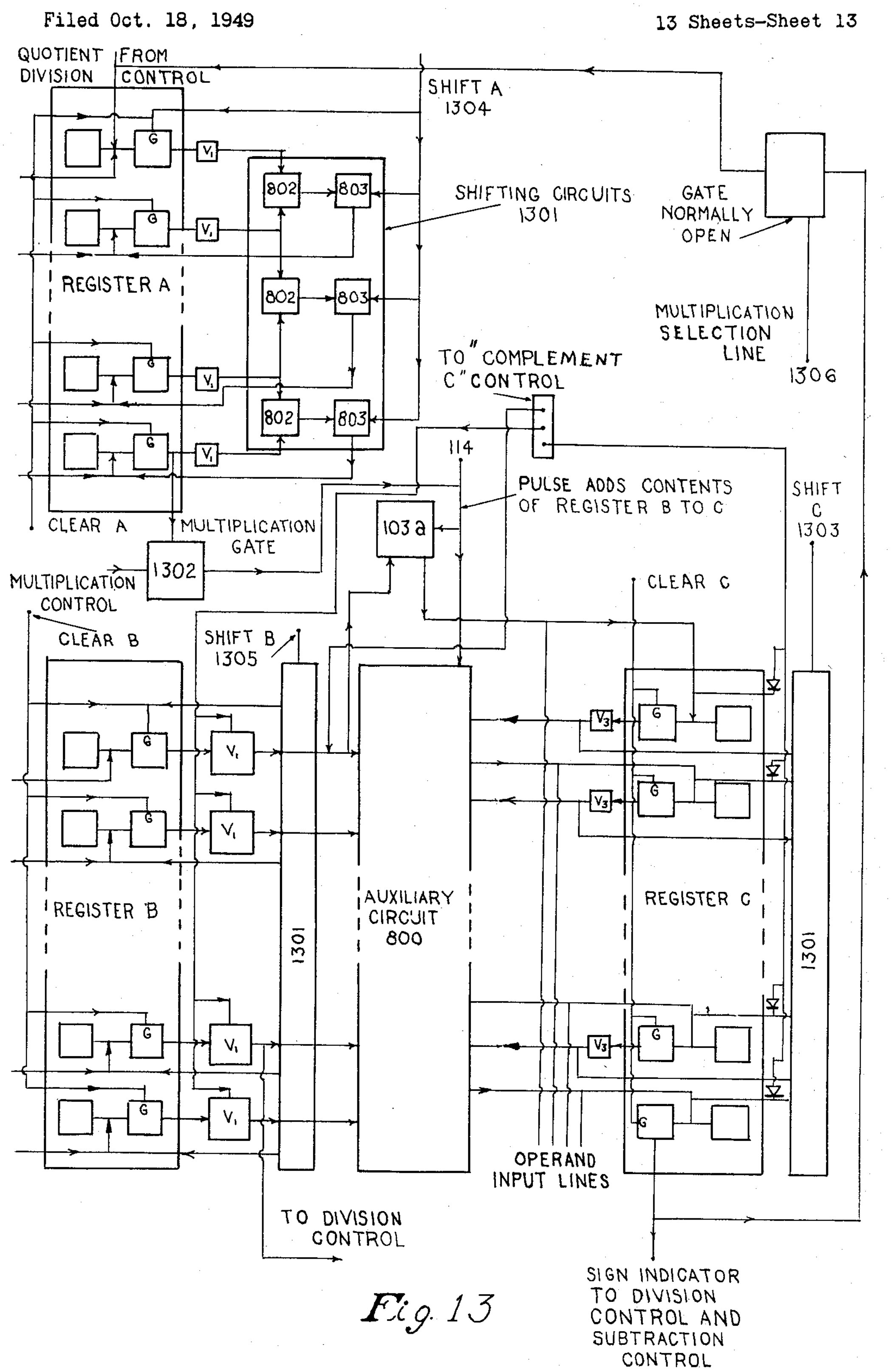
Fig. 13 illustrates the application of the new high speed register to a binary digital computing unit.

The application of the high speed register to a binary computing unit is shown in Fig. 13. The computing unit is comprised of one register of the static register type (register A) to which shifting circuits 1301 and clearing circuits have been added: one high speed register to which shifting, and clearing circuits have been added (register B), and one high speed bi-stable circuit register of the accumulator type to which clearing, shifting and complementing circuits have been added (register C). It is obvious that other types of registers with the appropriate supplementary circuits would also have been usable. The computing unit shown in Fig. 13 may be described as the arithmetic unit of a digital computer. In order that it may be used advantageously for the computation of problems that may be solved in a digital computer, the usual program control, storage facilities and all the other components required by a digital computer must be added to the units shown in Fig. 13. It is within the scope of the invention to utilize the high speed register described for any computation which may be accomplished in an electronic digital computer.

From the foregoing description it was shown how the auxiliary circuit described might be added to a modified accumulator register of conventional type to produce a high speed binary computing register in which the elementary addition operations (which are used to perform addition, subtraction, multiplication, and division), could be performed in $1/n$th the time required by the conventional register where $n$ is the number of binary digits in the number.

The basic units of the auxiliary circuit were shown to be a 3 input adding device, a 2 input adding device, and a special two level gate. It is evident that there are several variations of these basic units which will perform the stated function, depending on the type of conventional modified accumulator register chosen. Further details of the units were shown merely as an example of one embodiment of the basic units which would perform the stated function in conjunction with a register comprised of bi-stable circuit stages and without thought of its application being confined thereto.

At the present time the fastest binary computing registers are electronic registers, and consequently the fastest possible binary computers will result from application of the auxiliary circuit to a register comprised of electronic stages. However, the application is by no means confined to a binary digital computer of the electronic type. It could advantageouly be applied to the binary digital computers employing relay registers. The time required for an addition would again be decreased by a factor of $n$ where $n$ is the number of binary digits in the number.

It has been shown that in the construction of a binary computing unit, in certain instances, a complete auxiliary circuit may be added to a conventional register to cause it to perform an accumulator register function. It has been shown that in other cases only special parts of the auxiliary circuit are added to a conventional register to perform one of the supplementary functions necessary to the basic arithmetic operations. Further, it is evident that in the construction, operation, and application of the invention, manifold changes may be made in the precise form and arrangement of the parts thereof without exceeding the scope thereof, and we reserve the liberty of making all such changes as are required and permissible within the scope of the ensuing claims.

Having thus described our invention, what we claim as new and desire to secure by Letters Patent is:

1. In a digital computer, a plurality of registers each containing a number of bi-stable devices, one for each denominational order in the capacity of the registers, and means for determining before an addition is made whether addition of the values contained in the same denominational order of the said registers will produce a carry to the next higher order, comprising sensing mechanism connected between the devices in the same denominational order in said registers and controlled by the condition of the devices to which it is connected to give an indication whether the addition of the values contained therein will produce a carry to the next higher order.

2. In a digital computer, a plurality of registers each containing a number of bi-stable devices, one for each denominational order in the capacity of the registers, and means for determining whether the addition of the values contained in one register to the values contained in another register will cause changes in the values stored in said other register, comprising sensing mechanism connected to the devices in the same denominational order in both registers and controlled by the condition of said devices to give an indication whether the addition of the values in said order of the registers will produce a carry to the next higher order, connections also to said sensing mechanism to transmit thereto an indication of any carry from the next lower order of said registers, and another connection to said sensing mechanism to transmit thereto an indication of the value contained in the next higher stage in said one register.

3. In a digital computer, means for adding the values contained in one register to the values contained in another register comprising sensing mechanisms connected to the stages in the same denominational order in both registers and controlled by the condition of said stages to give an indication whether the addition of the values in said stages will produce a carry to the next higher order, other connections to said sensing mechanisms to transmit thereto an indication of any carry from the next lower order of said registers, additional connections to said sensing mechanisms to transmit thereto an indication of the value contained in the next higher stage of said one register, gating devices connected between said sensing mechanisms and the next higher stages of said other register and controlled by said sensing mechanisms and a control line connected in parallel to said gating devices.

4. An electrical computer having a plurality of registers, each comprising a number of devices having a plurality of stable conditions, there being one of said devices for each denominational order in the capacity of the registers, additive mechanisms connected between the devices occupying the same denominational orders in the registers and also to the device occupying the next higher order in one register, and gating means connecting said additive mechanism to the device occupying the next higher order in the other register; there being additive mechanisms and gating means for each digit space in the register above the lowest space.

5. The structure of claim 4, with the addition of a control line connected in parallel to each of said gating means.

6. In a digital computer, a plurality of registers each comprising a number of digit-indicating bi-stable devices, and means for causing addition of the value indicated in one register to the value indicated in the other register and indicating the resulting sum in said other register comprising additive mechanisms connected between the devices occupying the same denominational order in said registers and controlled by the condition of said devices to indicate whether a carry will be necessary from a lower order to the next higher order in performing the addition, additive devices connected to receive said carry indication from said additive mechanisms and also connected to the next higher digit indicating device in said one register and controlled by the condition of said last mentioned device and by any carry indication received from said additive mechanisms to determine whether the value contained in the last mentioned device when combined with the carry increment, if any, will necessitate a change in the next higher device of said other register, gating mechanisms connecting said additive devices and the next higher digit indicating devices of said other register and a control line connected in parallel to said gating mechanisms.

7. A digital computer comprising a plurality of registers, each having a plurality of digit indicating devices, one for each denominational order in the capacity of the registers, and means for adding the value contained in one register to the value contained in the other register and indicating the result of such addition in said other register comprising a first adding device connected to the digit indicating device occupying the same denominational order in each register, means for transmitting to said adding device an indication of any carry from the next lower order of said registers, a second adding device connected to said first adding device and also connected to the next higher digit indicating device of said one register, and a gating device controlled by said second adding device and connected to the next higher digit indicating device in said other register.

8. A binary digital computer having a plurality of registers each containing a plurality of bi-stable devices, one for each denominational order in the capacity of the registers, adding devices connected to and controlled by the bi-stable devices occupying the same denominational order in said registers, means for sending a carry indication from the next lower denominational order to said adding devices, said adding devices being also connected to and controlled by the bi-stable device in one of said registers occupying the order next higher than said same denominational order and connections from said adding devices to the bi-stable device in the next higher order of the other register.

9. A digital computer having a plurality of registers each having a plurality of bi-stable digit indicating devices, one for each denominational order in the capacity of the registers, gating devices connected to each digit indicating device in one of said registers, adding devices connected to adjacent pairs of said digit indicating devices in the other of said registers and also to the digit indicating device in the same denominational order in the other register as the lower one of said pair, one of said gating devices being connected directly between the digit indicating devices occupying the lowest denominational order in both of said registers and the remainder of said gating devices being connected between said adding devices and the higher of said pair of devices in said other register.

References Cited in the file of this patent

UNITED STATES PATENTS

| | | |
|---|---|---|
| 2,350,499 | Dickinson | June 6, 1944 |
| 2,364,540 | Luhn | Dec. 5, 1944 |
| 2,386,763 | Williams | Oct. 16, 1945 |
| 2,402,988 | Dickinson | July 2, 1946 |
| 2,484,115 | Palmer | Oct. 11, 1949 |
| 2,490,362 | Lake | Dec. 6, 1949 |

OTHER REFERENCES

Proceedings of the IRE, "A Digital Computer for Scientific Applications," by West et al., pages 1452 and 1460, December 1948.